United States Patent [19]
Crick

[11] Patent Number: 5,799,975
[45] Date of Patent: Sep. 1, 1998

[54] MAGNETIC FENDER COVER

[76] Inventor: Clint Raymond Crick, Suite #101, 9930 - 86 Avenue, Edmonton, Alberta, Canada, T6E 2L7

[21] Appl. No.: 680,154

[22] Filed: Jul. 15, 1996

[30] Foreign Application Priority Data

Jun. 12, 1996 [CA] Canada ............... 2,178,872

[51] Int. Cl.⁶ ........................................ B62B 3/00
[52] U.S. Cl. ............................ 280/770; 150/166
[58] Field of Search .................. 280/770; 150/166; 293/128; 49/57; 428/101, 102

[56] References Cited

U.S. PATENT DOCUMENTS

| | | | |
|---|---|---|---|
| 3,298,712 | 1/1967 | Greenstadt | 280/150 |
| 4,531,560 | 7/1985 | Balanky | 296/136 X |
| 4,849,272 | 7/1989 | Haney et al. | 428/102 |
| 4,884,824 | 12/1989 | Radke | 280/770 |
| 4,940,276 | 7/1990 | Madison | 296/136 |
| 4,997,229 | 3/1991 | Swanson | 296/136 |
| 5,115,848 | 5/1992 | Malone | 150/166 |
| 5,244,246 | 9/1993 | Cunningham | 296/136 |
| 5,273,316 | 12/1993 | Infante | 280/770 |
| 5,275,460 | 1/1994 | Kraus | 296/136 |
| 5,290,618 | 3/1994 | Olson et al. | 428/100 |

*Primary Examiner*—Richard M. Camby
*Attorney, Agent, or Firm*—Anthony R. Lambert

[57] ABSTRACT

A magnetic fender cover including a sheet form body with a plurality of magnets attached to the body. Each of the magnets have an attachment face used to magnetically attach the body to an object and an opposed face substantially opposed to the attachment face. The opposed face of each one of the plurality of magnets being in the same orientation. Flux concentrating shielding is overlaying the opposed face of each of the plurality of magnets, thereby reducing magnetic flux adjacent to the opposed face and increasing magnetic flux adjacent to the attachment face of each one of the plurality of magnets.

21 Claims, 3 Drawing Sheets

MAGNETIC FENDER COVER

FIELD OF THE INVENTION

The present invention relates to a magnetic fender cover.

BACKGROUND OF THE INVENTION

A fender cover is used by a mechanic to protect a fender of an automobile being repaired. In the absence of the fender cover, a paint finish on the fender of the automobile could be marred by one of the mechanic's tools, or by fasteners on and or particles embedded in the mechanic's overalls.

It is often difficult to attach the fender cover to the fender of the automobile in a secure manner. A common manner of securing the fender cover to the fender of the automobile, in recent years, is by means of a plurality of magnets. Two examples of fender covers that utilize magnets are U.S. Pat. No. 4,849,272 which issued to Haney et al in 1989, and U.S. Pat. No. 4,884,824 which issued to Radke, also in 1989.

When the mechanic is performing his work, he must lean across the fender cover. Inevitably, the mechanic's activities result in a downward or sideways force being exerted upon the fender cover. These forces tax the ability of the magnets to hold the fender cover in position. Modern automobiles have incorporated in their design sensitive electronic components. Mechanics must rely upon electronic equipment to assist in diagnosis and repair of these automobiles. Electronic equipment is adversely effected when exposed to a magnetic field with a field strength in excess of five gauss. It is not uncommon for the magnetic field generated by magnets used in fender covers to exceed eight hundred and fifty gauss. The "obvious" solution of increasing the strength of the magnets used on the magnetic fender covers to improve their holding capability is not a viable option. Mechanics are, therefore, coping with magnetic fender covers that do not have the desired holding ability and with respect to which great care must be taken so as to avoid damaging their test equipment and their customers automobiles.

SUMMARY OF THE INVENTION

What is required is a magnetic fender cover that will not adversely effect the operation of electronic equipment.

According to the present invention there is provided a magnetic fender cover which includes a sheet form body with a plurality of magnets attached to the body. Each of the magnets has an attachment face used to magnetically attach the body to an object and an opposed face substantially opposed to the attachment face. The opposed face of each one of the plurality of magnets is in the same orientation. Flux concentrating shielding is overlaying the opposed face of each of the plurality of magnets, thereby reducing magnetic flux adjacent to the opposed face and increasing magnetic flux adjacent to the attachment face of each one of the plurality of magnets.

With the magnetic fender cover, as described above, electronic equipment positioned adjacent to the opposed face of the magnetics is shielded from the adverse effects of the magnetic flux generated. This same shielding serves to concentrate the magnetic flux toward the attachment face, thereby increasing the holding capability of the magnetic fender cover. The preferred flux concentrating shielding is a covering of magnetic material covering the opposed face. The shielding can be made even more effective if it also covers the peripheral edge of each of the magnets. It is possible, of course, to shield a plurality of magnets within a single covering. Magnets shielded in the steel covering have a holding power that is six to nine times that of the same magnets without shielding.

Although the magnets can be attached anywhere to the sheet form body, it is preferred that they be positioned within a pocket. It is also preferred that the magnets be axially aligned within the pocket. This is consistent with the preferred attachment position which is on an inner lip inside the engine compartment, rather than on the exterior of the fender. Although beneficial effects may be obtained through the use of a magnetic fender cover, as described above, as a result of use over time the magnets tend to migrate to one end of the pocket. Even more beneficial results may, therefore, be obtained when the single pocket is subdivided into a plurality of magnet confining compartments. This can be done in a variety of ways, such as by heat sealing or transverse stitching after the magnets have been inserted into the pocket.

Although beneficial effects may be obtained through the use of the magnetic fender cover, as described above, the magnets must often assume a different angular position relative to the body in order to accommodate different models of vehicles. Even more beneficial results may, therefore, be obtained when the pocket is a sheath-like pocket that is pivotally secured along a longitudinal peripheral edge of the sheath-like pocket to the body. The sheath-like pocket is movable from a starting position substantially parallel to the body to an attachment position oriented at an angle to the body.

It is preferred that the sheath-like pocket, as described above, be spaced from a peripheral edge of the body, thereby [de]fining an elongate flap along the peripheral edge. It is also preferred that a trough be positioned along a peripheral edge of the flap. Mechanics tend to place tools, fasteners and other objects on the fender cover. When such objects fall into an engine compartment they can be difficult to retrieve and sometimes become lost. With the flap, as described, any such objects falling into the engine compartment are caught in the trough. A number of further features can be added to further enhance the value of this flap. The flap is pivotally movable between an extended position extending from the body and an overlaying position overlaying the body. This allows the flap to be pivoted out of the way when working on an engine component immediately adjacent to the fender. It is preferred that the elongate flap be subdivided into a plurality of smaller flap sections. This enables only that portion of the flap which is in the way to be pivoted to the overlaying position. The flap can also have included means for attaching tools and a plurality of storage receptacles.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
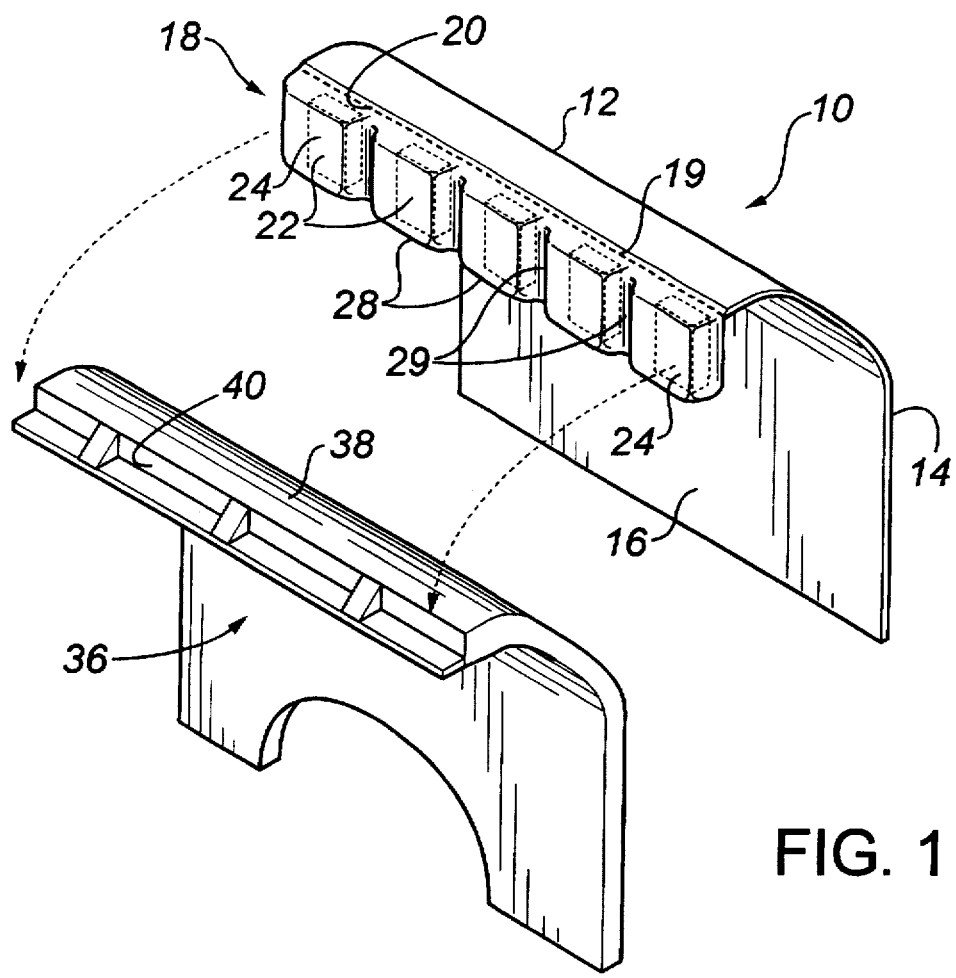
FIG. 1 is an exploded perspective view of a first embodiment of magnetic fender cover constructed in accordance with the teachings of the present invention being placed upon a fender.

A first preferred embodiment and a second preferred embodiment of a magnetic fender cover generally identified by reference numerals 10 and 11, respectively, will now be described with reference to FIGS. 1 through 6.

Referring to FIG. 1, there is illustrated a first embodiment 10 of magnetic fender cover. First embodiment 10 has a sheet form body 12 having a first surface 14 and a second surface 16. A pocket in the form of a sheath-like pocket 18 is positioned along a top peripheral edge 20 of body 12. Sheath-like pocket 18 has a longitudinal peripheral edge 19 pivotally secured along top peripheral edge 20. This form of pocket is preferred as it allows angular adjustments to be made, as will hereinafter be further described.

Figure 2:
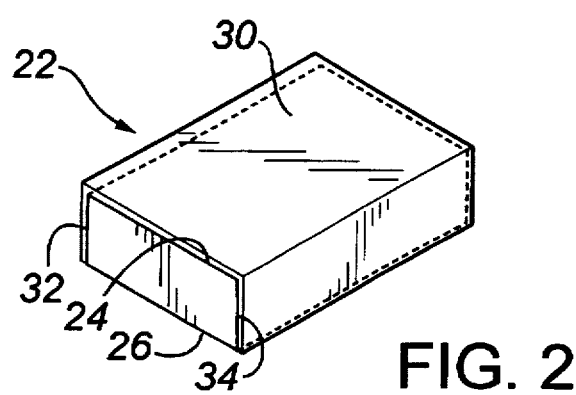
FIG. 2 is a perspective view of a shielded magnet from the magnetic fender cover illustrated in FIG. 1.

A plurality of magnets 22 are disposed in sheath-like pocket 18 of body 12. Referring to FIG. 2, each of magnets 22 has an opposed face 24 and a attachment face 26. Attachment face 26 is used to magnetically attach body 12 to an object. Opposed face 24 is substantially opposed to attachment face 26. The term "substantially" is used due to the fact that not all magnets are six sided parallel-piped prisms as illustrated. Sheath-like pocket 18 is just wide enough to accommodate a row of magnets 22 axially aligned. Sheath-like pocket 18 is subdivided into a plurality of magnet confining compartments 28. Compartments 28 are formed by heat sealing or sewing along lines 29, after magnets 22 have been positioned in sheath-like pocket 18. Referring to FIG. 2, each of magnets 22 are covered by flux concentrating shielding. The preferred form of flux concentrating shielding is a covering 30 of magnetic material, preferably steel. Covering 30 covers opposed face 24 and two peripheral sides 32 and 34, respectively, of each of magnets 22. Covering 30 reduces magnetic flux adjacent to opposed face 24, and increases magnetic flux adjacent to attachment face 26. Magnets 22 are oriented within sheath-like pocket 18 so that opposed face 24 of each of magnets 22 are oriented in the same direction. Sheath-like pocket 18 has a starting position parallel to body 12. This places opposed face 24 of each of magnets 22 in an orientation toward first surface 14 of body 12 and, more importantly, places attachment face 26 of each of magnets 22 so that the flux is directed away from any testing instruments that may be positioned on first surface 14 of body 12. From this starting position, illustrated in FIG. 1, sheath-like pocket 18 is movable to an attachment position as will hereinafter be further described.

Referring to FIG. 1, a fender 36 is illustrated. Fender 36 has a contoured exterior 38 and an inner lip 40. Inner lip 40 is recessed to receive a hood (not shown) that covers an engine compartment (not shown). Inner lip 40 can be considered to be an upper perimeter for the engine compartment. Fender cover 10 is attached to fender 36 by laying second surface 16 of body 12 over exterior 38 of fender 36 and angularly positioning sheath-like pocket 18 so that attachment face 26 of magnets 22 magnetically engage inner lip 40. In this attachment position, sheath-like pocket 18 must be capable of assuming a variety of angles in its attachment position, as the angular relationship between exterior 38 and inner lip 40 varies between different models of vehicles. Fender cover 10 could be used in its starting position laid substantially flat directly onto exterior 38. This is not recommended, however, as when the mechanic leans upon fender cover 10, magnets 22 may dent or otherwise mar the finish on exterior 38.

Figure 3:
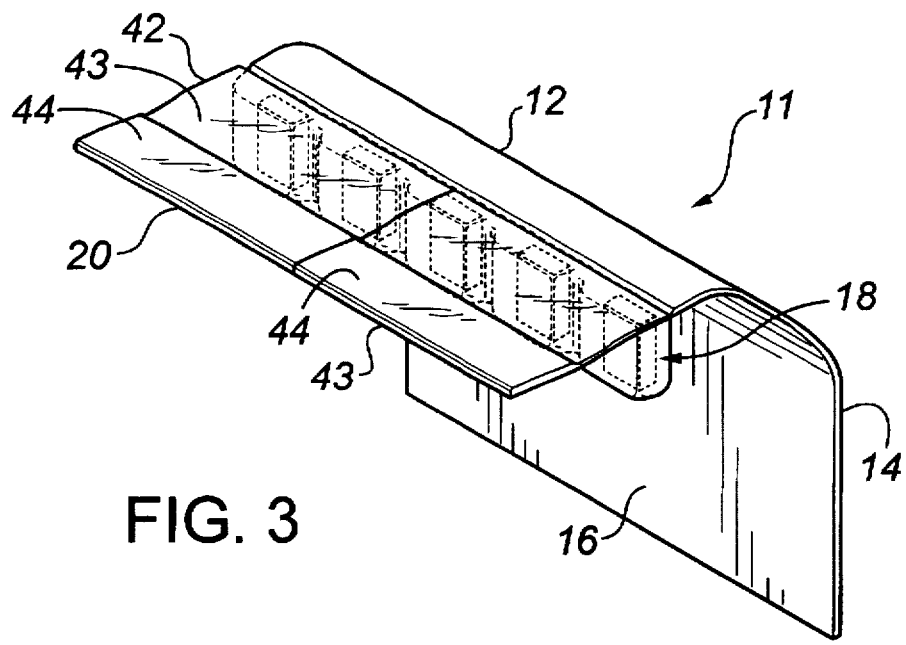
FIG. 3 is a perspective view of a second embodiment of magnetic fender cover constructed in accordance with the teachings of the present invention, and having an attached flap in a first or forward extended position.
Figure 5:
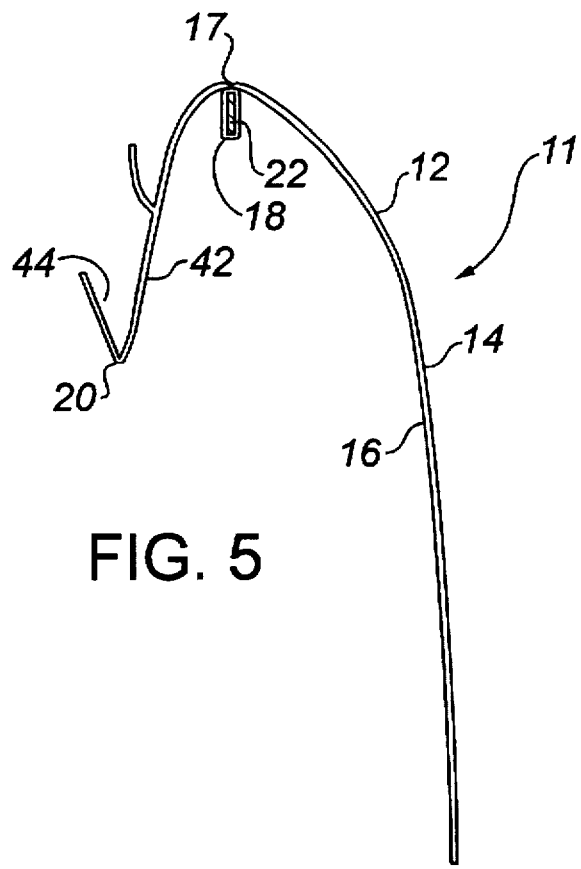
FIG. 5 is a side elevation view, in section, of the second embodiment of magnetic fender cover illustrated in FIG. 3.

Referring to FIG. 3, there is illustrated a second embodiment 11 of fender cover. Those components of second embodiment 11 which are identical to first embodiment 10 have been identified by the identical reference numerals. Referring to FIG. 5, in second embodiment 11, however, sheath-like pocket 18 is spaced from top peripheral edge 20, thereby forming a flap 42 between pocket 18 and top peripheral edge 20. In second embodiment 11, sheath-like pocket 18 maintains a starting position that is substantially parallel to body 12.

Figure 4:
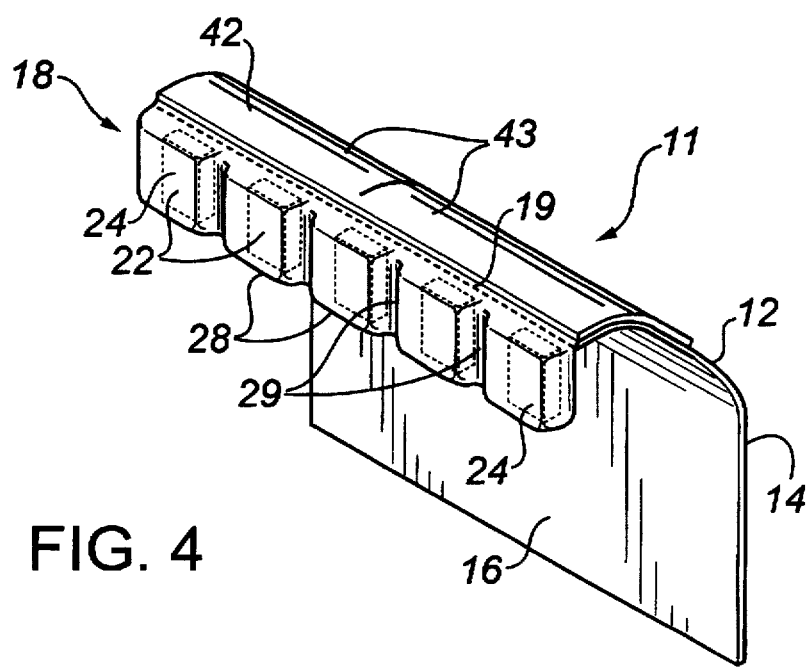
FIG. 4 is a perspective view of the second embodiment of magnetic fender cover illustrated in FIG. 3, with the attached flap in a second or overlaying position.
Figure 6:
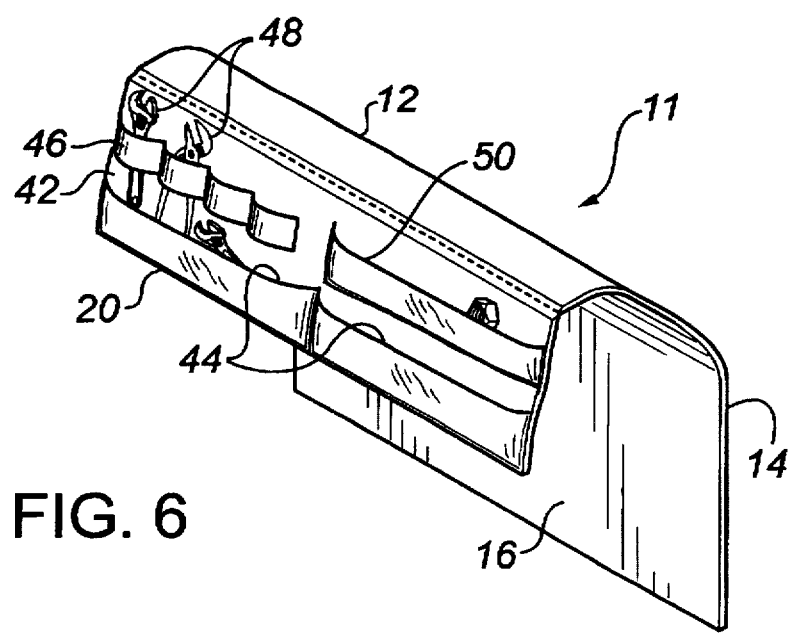
FIG. 6 is a perspective view of the second embodiment of magnetic fender cover illustrated in FIG. 3, with additional storage capability added.

When sheath-like pocket 18 assumes an attachment position, as illustrated in FIG. 5, attachment face 26 of each of magnets 22 is oriented so that the flux is directed away from any electronic engine components that may be positioned in the engine compartment adjacent fender 36. Flap 42 is also movable between a first or extended position, as illustrated in FIGS. 3 or 5, and a second or overlaying position as illustrated in FIG. 4. A trough 44 extends transversely across flap 42 on first surface 14 of body 12, such that objects falling into the engine compartment are caught in trough 44. Referring to FIG. 6, flap 42 can be made with loops 46 which are provided for attaching tools 48. Flap 42, can also include storage receptacles 50. Referring to FIG. 3, flap 42 is subdivided into a plurality of smaller flap sections 43. One of flap sections 43 can be moved into the second or overlaying position to allow the mechanic access to the engine compartment adjacent fender 36, while the other of flap sections 43 remains in the first or extended position.

It is preferred that body 12 be made from a single sheet of material, that has been folded, then plastic welded or sewn along fold lines 17 to create sheath-like pocket 18, as illustrated in FIG. 5. It is preferred that both second surface 16 of body 12 and that portion of sheath-like pocket 18 providing a contact surface for attachment face 26 of magnets 22 be made of a non-slip material. The non-slip material enhances the holding ability of the magnets by providing a friction force to preclude movement. It is preferred that the material used for body 12 be a polyvinyl chloride (PVC) covered cloth. The PVC covered cloth can be wiped clean. It does not rip or tear under normal usage. It is not damaged by chemical agents, such as, solvent, varsol, and the like. It is non-abrasive and relatively non-slip. It is light and pliable. In sewing along fold line 17, which forms flap 42 care is taken to ensure that flap 42 remains free to move between the first position and the second position. It is preferred that ceramic magnets be used with steel shielding.

It will be apparent to one skilled in the art that a fender cover constructed in accordance with the teachings of the present invention enables more powerful magnets to be used without creating magnetic interference. It will also be apparent to one skilled in the art that second embodiment 11 of the fender cover provides a mechanic with an option of either placing flap 42 in the first position or the second position. In the first position, loops 46 can be used to hold tools 48 and storage receptacles 50 can be used to hold fasteners and the like. In the second position, flap 42 allows access to components in the engine compartment immediately adjacent to fender 36 and increases the protective padding on exterior 38 of fender 36. Should an object accidently fall, when flap 42 is in the first position, it is caught in trough 44 before it enters the engine compartment. It will finally be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A magnetic fender cover, comprising:
   a sheet form body;
   a plurality of magnets attached to the body, each of the magnets having an attachment face used to magnetically attach the body to an object, an opposed face substantially opposed to the attachment face and at least one other surface connecting the opposed face and the attachment face, the opposed face of the plurality of magnets being in the same orientation; and
   flux concentrating shielding in the form of a covering of magnetic material overlaying the opposed faces of the plurality of magnets, thereby reducing magnetic flux adjacent to the opposed faces and increasing magnetic flux adjacent to the attachment face.

2. The magnetic fender cover as defined in claim 1, wherein the magnets are in at least one pocket.

3. The magnetic fender cover as defined in claim 2, wherein the at least one pocket is a sheath-like pocket that is secured along a longitudinal peripheral edge of the sheath-like pocket to the body, the sheath-like pocket being movable from a starting position substantially parallel to the body to an attachment position oriented at an angle to the body.

4. The magnetic fender cover as defined in claim 3, wherein the plurality of magnets beg axially aligned within the sheath-like pocket.

5. A magnetic fender cover, comprising:
   a sheet form body of non-slip material having a first surface and a second surface;
   a plurality of magnets positioned in a plurality of magnet confining compartments in a sheath-like pocket that is secured long a longitudinal peripheral edge of the sheath-like pocket to the body, the sheath-like pocket being movable from a starting position substantially parallel to the body to an attachment position oriented at an angle to the body, each of the magnets being a six sided parallel-piped prism with an attachment face used to magnetically attach the body to an object, an opposed face in 180 degree opposed relation to the attachment face and four peripheral sides, the opposed face of each one of the plurality of magnets being in the same orientation in the at least one sheath-like pocket;
   a flux concentrating covering of magnetic material overlaying the opposed face of each of the plurality of magnets and a peripheral edge of some of the plurality of magnets, thereby reducing magnetic flux adjacent to the opposed face and increasing magnetic flux adjacent to the attachment face of each of the plurality of magnets;
   the sheath-like pocket being spaced from a peripheral edge of the body thereby defining an elongate flap between the sheath-like pocket and the peripheral edge, the flap being pivotally movable between a variety of angles of extended positions extending from the body and an overlaying position overlaying the body, the flap having a peripheral edge with a trough extending along the peripheral edge, such that objects falling into an engine compartment are caught in the trough.

6. The magnetic fender cover as defined in claim 2, wherein the at least one pocket is subdivided into a plurality of magnet confining compartments.

7. The magnetic fender cover as defined in claim 1, wherein the body is of a non-slip material.

8. The magnetic fender cover as defined in claim 3, wherein the sheath-like pocket is of a non-slip material.

9. The magnetic fender cover as defined in claim 3, wherein the at least one sheath-like pocket is spaced from a peripheral edge of the body, thereby forming a flap.

10. The magnetic fender cover as defined in claim 9, wherein the flap includes a trough extending along the peripheral edge, such that objects falling into an engine compartment are caught in the trough.

11. The magnetic fender cover as defined in claim 1, wherein each of the magnets is a six sided parallel-piped prism with the opposed face being in 180 degree opposed relation to the attachment face and the other surfaces being four peripheral sides.

12. The magnetic fender cover as defined in claim 11, wherein the flux concentrating shielding is a covering of magnetic material that covers the opposed face and at least one peripheral side of at least one of the plurality of magnets.

13. A magnetic fender cover, comprising:
    a sheet form body having a first surface and a second surface;
    a plurality of magnets positioned in at least one sheath-like pocket secured along a longitudinal peripheral edge of the sheath-like pocket to the body, the sheath-like pocket being movable from a starting position substantially parallel to the body to an attachment position oriented at an angle to the body, each of the magnets having an attachment face used to magnetically attach the body to an object, an opposed face substantially opposed to the attachment face and a plurality of other surfaces, the opposed face of each one of the plurality of magnets being in the same orientation in the at least one sheath-like pocket; and
    flux concentrating covering of magnetic material overlaying the opposed face of each of the plurality of magnets, thereby reducing magnetic flux adjacent to the opposed face and increasing magnetic flux adjacent to the attachment face of each of the plurality of magnets.

14. The magnetic fender cover as defined in claim 13, wherein the sheath-like pocket is subdivided into a plurality of magnet confining compartments.

15. The magnetic fender cover as defined in claim 13, wherein the body and a surface of the sheath-like pocket adjacent the attachment face of the magnets is of a non-slip material, such that friction provides resistance to movement.

16. The magnetic fender cover as defined in claim 13, wherein the at least one sheath-like pocket is spaced from a peripheral edge of the body thereby defining an elongate flap.

17. The magnetic fender cover as defined in claim 16, wherein the elongate flap is subdivided into a plurality of smaller flap sections.

18. The magnetic fender cover as defined in claim 16, wherein the flap is pivotally movable between an extended position extending from the body and an overlaying position overlaying the body.

19. The magnetic fender cover as defined in claim 16, wherein the flap has a peripheral edge with a trough extending along the peripheral edge, such that objects falling into an engine compartment are caught in the trough.

20. The magnetic fender cover as defined in claim 16, wherein the flap includes means for attaching tools.

21. The magnetic fender cover as defined in claim 16, wherein the flap includes a plurality of storage receptacles.

* * * * *